United States Patent
Kuhn et al.

(10) Patent No.: US 9,854,145 B2
(45) Date of Patent: Dec. 26, 2017

(54) METHOD FOR PRODUCING A CAMERA MODULE, AND CAMERA MODULE, WHERE FUNCTIONAL UNITS ARE FORMED ON A COMMON BOARD

(71) Applicant: Scholly Fiberoptic GmbH, Denzlingen (DE)

(72) Inventors: Matthias Kuhn, Freiburg i. Br. (DE); Massimo Kubon, Emmendingen (DE)

(73) Assignee: SCHOLLY FIBEROPTIC GMBH, Denzlingen (DE)

(*) Notice: Subject to any disclaimer, the term of this patent is extended or adjusted under 35 U.S.C. 154(b) by 27 days.

(21) Appl. No.: 15/041,721

(22) Filed: Feb. 11, 2016

(65) Prior Publication Data
US 2016/0255259 A1 Sep. 1, 2016

(30) Foreign Application Priority Data
Feb. 28, 2015 (DE) .................. 10 2015 002 534

(51) Int. Cl.
| | |
|---|---|
| H04N 5/225 | (2006.01) |
| G02B 23/24 | (2006.01) |
| G02B 13/00 | (2006.01) |

(52) U.S. Cl.
CPC ....... H04N 5/2257 (2013.01); G02B 23/2415 (2013.01); G02B 13/0085 (2013.01)

(58) Field of Classification Search
CPC .............. H04N 5/2257; G02B 23/2415; G02B 13/0085
See application file for complete search history.

(56) References Cited

U.S. PATENT DOCUMENTS

| | | | |
|---|---|---|---|
| 7,808,551 B2 | 10/2010 | Ito et al. | |
| 8,432,485 B1* | 4/2013 | Martinez | H04N 5/2254 348/207.1 |
| 8,471,392 B2 | 6/2013 | Kojima | |
| 2001/0055073 A1* | 12/2001 | Shinomiya | H01L 27/14618 348/374 |
| 2004/0223072 A1* | 11/2004 | Maeda | H01L 27/14618 348/340 |
| 2006/0257081 A1* | 11/2006 | Ishigami | G02B 6/4201 385/92 |
| 2008/0117324 A1* | 5/2008 | Minamio | H04N 5/2254 348/340 |
| 2009/0085138 A1* | 4/2009 | Ryu | H01L 25/50 257/434 |
| 2014/0043525 A1* | 2/2014 | Azuma | H04N 5/232 348/357 |
| 2016/0274350 A1* | 9/2016 | Aizenfeld | G02B 23/2438 |

FOREIGN PATENT DOCUMENTS

| | | |
|---|---|---|
| JP | H11271646 | 10/1999 |
| JP | 2011166080 | 8/2011 |
| WO | 2014026202 | 2/2014 |

* cited by examiner

*Primary Examiner* — Shahbaz Nazrul
(74) *Attorney, Agent, or Firm* — Volpe and Koenig, P.C.

(57) ABSTRACT

In the case of a camera module (1) including at least two camera functional units (2, 3, 4, 5, 22) arranged one behind another in a stack arrangement, it is provided to form the camera functional units (2, 3, 4, 5, 22) on a common main body (11), wherein the camera functional units (2, 3, 4, 5, 22) are aligned with respect to one another in the use position by a folding or bending process.

18 Claims, 4 Drawing Sheets

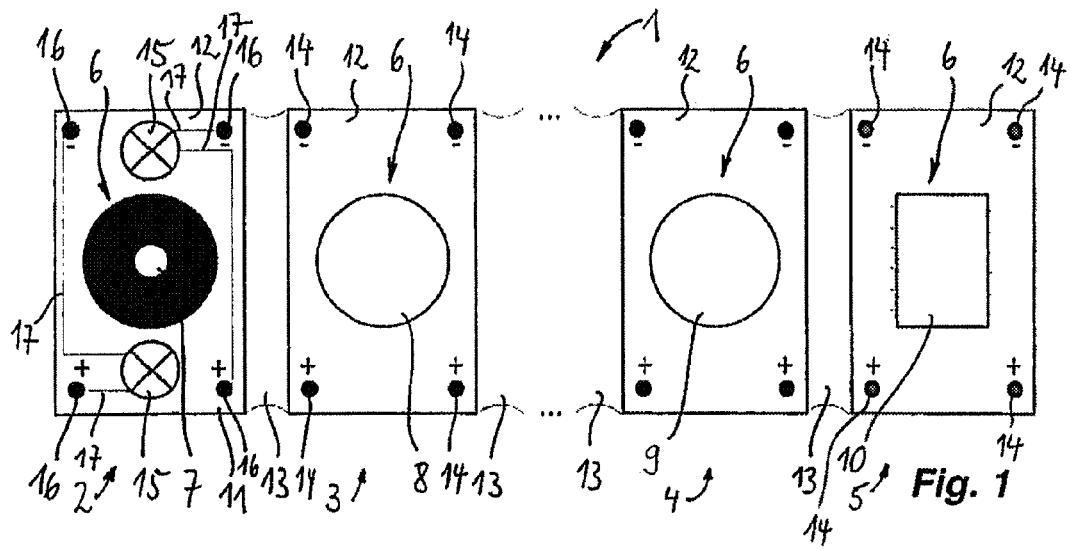
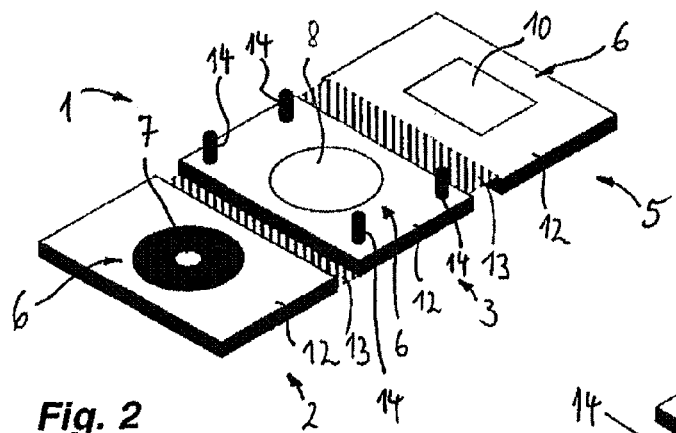
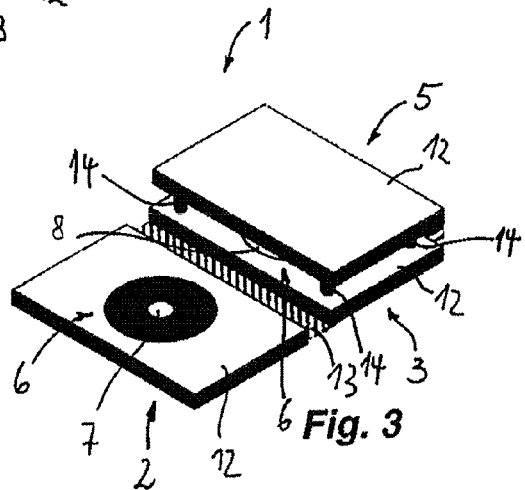
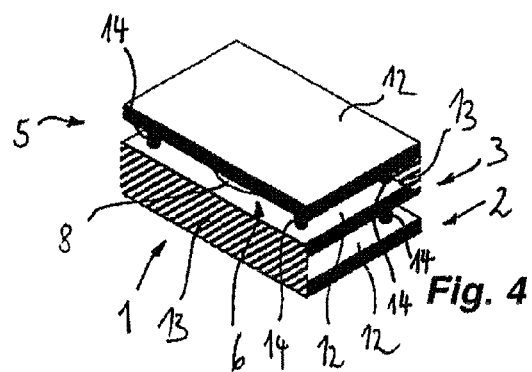
Fig. 1
Fig. 2
Fig. 3
Fig. 4

METHOD FOR PRODUCING A CAMERA MODULE, AND CAMERA MODULE, WHERE FUNCTIONAL UNITS ARE FORMED ON A COMMON BOARD

INCORPORATION BY REFERENCE

The following documents are incorporated herein by reference as if fully set forth: German Patent Application No. 10 2015 002 534.1, filed Feb. 26, 2015.

BACKGROUND

The invention relates to a method for producing a camera module, in particular for an endoscope, wherein at least two, in particular at least three, camera functional units are arranged one behind another in a respective plane in a beam path of the camera module.

The invention furthermore relates to a camera module, in particular for an endoscope, comprising at least two, in particular at least three, camera functional units which are arranged one behind another in a respective plane in a beam path of the camera module. The planes are thus aligned one behind another in each case transversely with respect to the beam path.

Such camera modules are known and are used in endoscopes, for example, in order to record a field of view. The camera modules generally have a plurality of camera functional units which are arranged one behind another in the propagation direction of an associated beam path in order in each case to form the desired optical function. The assembly of a camera module is complex because the individual components often have very small dimensions. In addition, the components have to be exactly aligned with one another in order to enable sufficiently accurate image recording. In this case, the individual camera functional units in each case implement a function in the image recording process. The camera functional units can therefore bear for example optical elements such as lens arrangements, diaphragms, diffraction gratings, mirrors, filters, protective covers, electrical illumination means and/or image sensors.

SUMMARY

The invention is based on the object of simplifying the production of a camera module.

In order to achieve this object, one or more of the features of the invention are provided. In particular, therefore, in order to achieve the stated object, in the case of a method of the type described in the introduction, it is provided that the at least two camera functional units are formed on a common main body and are subsequently aligned with respect to one another in a folding or bending process. What is advantageous here is that the individual camera functional units are providable in a manner already connected to one another. Consequently, mounting of individual parts can be reduced or even dispensed with, and the formation on a common main body makes it possible to predefine an order of the camera functional units in the beam path by means of a folding or bending scheme. This simplifies the production of a camera module. The invention is preferably applied to endoscopes, such that an endoscope camera module is produced.

The invention thus makes it possible for the production steps used in each case to form the camera functional units to be separated in a simple manner from the production steps used to arrange the camera functional units one behind another in the beam path. In this case, according to the invention, the first-mentioned production steps can be performed on an unfolded or unbent main body, while the production steps mentioned second can be performed on the finished formed main body provided with the camera functional units.

In accordance with one advantageous configuration of the invention, it can be expedient if at least three camera functional units are arranged one behind another in a respective plane along a beam path of the camera module, and wherein at least two, in particular at least three, camera functional units are formed on a common main body and are subsequently aligned with respect to one another in a folding or bending process.

It can be particularly expedient according to the invention if the camera functional units are provided with in each case at least one or exactly one device, selected from an image sensor, a diaphragm and/or a lens arrangement. As an alternative thereto, it can furthermore be provided according to the invention that one camera functional unit is provided with an image sensor and two camera functional units are provided with a respective lens arrangement. This can be advantageous particularly if the image sensor is not formed on the main body, rather the main body is placed onto the image sensor.

Alternatively or supplementarily, it can therefore be provided according to the invention that a camera functional unit provided with an image sensor is not formed on the main body. In particular, in this case, it can be provided according to the invention that the main body is placed onto the image sensor.

In a further advantageous configuration, it can be provided that a first camera functional unit of the at least two of the camera functional units formed on the common main body is provided with at least one image sensor. What is advantageous here is that a digital image recording is providable by the method according to the invention in the camera module. The image sensor is preferably molded in. Further mounting steps for mounting the image sensor can thus be dispensed with. It is particularly expedient here if the first camera functional unit is provided with the image sensor before the folding or bending process.

In one advantageous configuration, it can be provided that a first, for example the already mentioned first, and/or a second camera functional unit of the at least two of the camera functional units formed on the common main body are/is formed with in each case at least one lens arrangement. What is advantageous here is that an order of the lens arrangements in the beam path is pre-definable in a simple manner. The lens arrangement is preferably molded in. This molding-in can be affected, in a first variant, by insertion of a glass lens and subsequent encapsulation of said glass lens or, in a second variant, by integral or monolithic formation of the lens with the surrounding material. What is advantageous here is that insertion of the lens arrangement during mounting can be dispensed with. It is particularly expedient here if the camera functional unit(s) is/are provided with the respective lens arrangement before the folding or bending process.

It is preferably provided that all camera functional units of at least one optical beam path are formed on a common main body.

In one advantageous configuration, it can be provided that the camera functional units are designed for stereoscopic vision. Consequently, a relative alignment of in particular functionally identical optical elements with respect to one another can be integrated into the camera functional unit, such that alignment and/or checking steps can be dispensed with during production. It is particularly expedient here if optical elements are formed in each case in pairs. Two identical beam paths offset with respect to one another for stereoscopic vision can thus be realized in a simple manner. Preferably, the optical elements corresponding to one another in pairs are aligned in a manner rigidly connected to one another and are not folded or bent relative to one another.

In one advantageous configuration, it can be provided that the at least two of the camera functional units formed on the common main body, before the folding or bending process, are arranged in an unfolded fashion, in particular in a flat fashion and/or substantially or exactly in a common plane. What is advantageous here is that the camera functional units are arrangeable clearly before the beginning of final mounting. Preferably, all camera functional units of a beam path are arranged in a common plane before the folding or bending process. The main bodies with the finished formed camera functional units are thus transportable and storable in a space-saving fashion. In the planar arrangement, the accessibility of the main body is particularly expedient for the formation of the camera functional units.

In one advantageous configuration, it can be provided that the at least two of the camera functional units formed on the common main body are formed in each case on a frame of the main body. The frames are preferably rigid in each case. What is advantageous here is that holding structures are formed which can be used to hold the camera functional units in each case on a housing. It is particularly expedient here if the frames are produced in a manner connected to one another via a folding or bending section. What is advantageous here is that the folding or bending process already mentioned is predefineable by a shape of the main body, in particular the folding or bending sections. The frame can be formed here in each case integrally with the main body. The frame can also be formed separately from the main body and in a manner connected thereto. Preferably, the frames are integrally connected to one another. Consequently, the main body with the folding and bending sections and the frames can be produced in a simple manner. Alternatively or additionally, it can be provided here that on at least one frame there is formed at least one spacer element projecting from a plane described by the frame. A distance and/or an alignment between the frames in the use position can thus be predefined in a simple manner. The folding or bending process can be carried out until the at least one spacer element contacts an adjacent frame. If the camera module is designed for stereoscopic vision, then mutually corresponding optical elements of a right and of a left beam path are preferably formed in a manner connected to one another without folding or bending sections.

In one advantageous configuration, it can be provided that the main body is molded and/or pressed. Consequently, a cost-effective production method is described with which a large number of different camera functional units are producible and/or a main body is prepareable for a large number of different camera functional units. It is expedient if the main body is produced by thermoforming, in particular by compression or injection molding, and/or by reshaping or primary forming, preferably by precision blank pressing. A main body composed of a polymer material and/or composed of a glass is particularly advantageous. By way of example, PC (polycarbonate) or PMMA (polymethyl methacrylate, Plexiglas) or COC (cycloolefin copolymer) can be used as polymer material. It can be provided here that the respective camera functional unit, in particular the lens arrangement already mentioned, is formed on the main body in the molding and/or pressing method. What is advantageous here is that further production steps can be dispensed with. It is particularly expedient if the main body is completely unfolded during the molding or pressing method.

In one advantageous configuration, it can be provided that the at least two camera functional units, in particular formed on the common main body, can be produced in a two- or multicomponent production method. What is advantageous here is that different refractive indices and/or different optical transmissivities are realizable on the camera functional units in a simple manner.

In one advantageous configuration, it can be provided that a predetermined breaking location between the at least two of the camera functional units formed on the common main body is separated during the folding or bending process. What is advantageous here is that an installation size of the finished mounted camera module—for example for insertion into a housing—can be reduced by virtue of the fact that a connection between the camera functional units which is possibly disturbing in the use position of the camera functional units, for example the folding or bending section already mentioned, is eliminated during the folding or bending process already mentioned.

In order to achieve the stated object, in the case of a camera module, one or more of the features of the invention directed to a camera module are provided. In particular, therefore, according to the invention, in order to achieve the object, in the case of a camera module of the type described in the introduction, it is proposed that at least two, in particular at least three, camera functional units are produced on a common main body. What is advantageous here is that the camera functional units can already be identified and treated as associated in a simple manner before final mounting. The handling and storage of components of the camera module before final mounting can thus be simplified.

In accordance with one advantageous configuration of the camera module according to the invention, it can be provided that the camera functional unit(s) is/are provided with in each case at least one or exactly one device, selected from an image sensor, a diaphragm and/or a lens arrangement. As an alternative thereto, it can furthermore be provided according to the invention that one camera functional unit is provided with an image sensor and two camera functional units are provided with a respective lens arrangement. This can be advantageous particularly if the image sensor is not formed on the main body, rather the main body is placed onto the image sensor.

As an alternative or supplementarily thereto, it can therefore be provided that a camera functional unit provided with an image sensor is not formed on the main body, in particular in such a way that the main body is placeable or placed onto the image sensor.

In one advantageous configuration, it can be provided that a first camera functional unit of the at least two of the camera functional units formed on the common main body has at least one image sensor. A digital or analog image recording can thus be carried out. Preferably, the image sensor is molded into the first camera functional unit. Complicated insertion of the image sensor into the main body can thus be dispensed with.

In one advantageous configuration, it can be provided that a first and/or a second camera functional unit of the at least two camera functional units, in particular formed on the common main body, have/has in each case at least one lens arrangement. What is advantageous here is that lens arrangements can be realized in different planes of the camera module. Preferably, the at least one lens arrangement is in each case molded in. Complicated insertion of the lens arrangement into the main body can thus be dispensed with.

Preferably, all camera functional units of a beam path or of all beam paths are formed on a common main body, preferably except for the image sensor. A number of individual parts before assembly of the camera module can thus be reduced.

In one advantageous configuration, it can be provided that the camera functional units are designed for stereoscopic vision. What is advantageous here is that an increased number of components required for stereoscopic vision are arranged unambiguously in a fixed relative alignment and/or in a predefined order. The number of individual parts is reduced by the use of a connecting main body. It can be provided here that the camera functional units have optical elements in each case in pairs. Consequently, the optical elements of a left beam path are providable, already before final mounting, in a manner aligned with corresponding optical elements of a right beam path in a finished way. What is furthermore advantageous is that optical elements, for example lenses, diaphragms, filters and/or image sensors, which correspond to one another as left element and as right element with regard to stereoscopic vision are held in unambiguous alignment and association with respect to one another. Optical elements which correspond to one another can be formed here in each case on a common rigid and/or folding- or bending-free frame.

In one advantageous configuration, it can be provided that the at least two of the camera functional units formed on the common main body are formed in each case on a frame of the main body. The frames are preferably rigid in each case. The holding structures already mentioned are thus formed. It can be provided here that the frames are connected to one another via a folding or bending section in order to predefine a defined alignment of the frames with respect to one another in the use position. It is particularly expedient if the frames are integrally connected to one another via the folding or bending section. What is advantageous here is that the main body is producible in a simple production method. Alternatively or additionally, it can be provided that the frames have a predetermined breaking location at corresponding edges. Consequently, the folding or bending section is reduced or even removed in the use position.

In one advantageous configuration, it can be provided that on at least one frame there is formed at least one spacer element projecting from a plane described by the frame, said spacer element making contact with another frame. A stop is thus realized for a defined arrangement and/or alignment of the frames with respect to one another and/or for a folding or bending process. Additional securing means for the permanent maintenance of the arrangement and/or alignment can be dispensed with. The spacer elements here can be shaped on the main body integrally with the latter or can be formed separately from the main body and in a manner connected thereto.

In one advantageous configuration, it can be provided that at least one camera functional unit of the at least two, in particular of the at least three, camera functional units at a distal end has an electrical illumination means. A distal end of a camera module can thus be illuminated. This is particularly advantageous for use on an endoscope since the examination area can be illuminated. The illumination means can be fixed here using SMD (surface mounted device) technology. This results in a space-saving, compact design. It is particularly expedient if the illumination means is arranged on a distal camera functional unit. An examination site can thus be illuminated directly.

In one advantageous configuration, it can be provided that at least one proximal camera functional unit of the at least two, in particular of the at least three, camera functional units has an electrical illumination means. Preferably, that camera functional unit which also carries the image sensor is equipped with an electrical illumination means. What is advantageous here is that dissipation of heat from the electrical illumination means can be carried out more simply at the proximal end.

It can be provided here that further, preferably all, camera functional units of the or a stack arrangement in each case have light guides by which the generated light of the illumination means is guidable to a distal end.

These light guides can be formed as the spacer elements already mentioned or as additional spacer elements which hold the camera functional units at the defined distance with respect to one another.

In one advantageous configuration, it can be provided that an electrical lead between the at least two of the camera functional units formed on the common main body is formed in or on a, for example the mentioned, folding or bending section of the main body between the at least two camera functional units. The folding or bending section is additionally usable as a carrier for electrical leads between the functional units and/or from and/or to the functional units. Separately guided leads can thus be dispensed with. Alternatively or additionally, an electrical lead can be formed in or on a, for example the already mentioned, spacer element of the main body between the at least two camera functional elements. The electrical lead can already drive and/or supply the electrical illumination means.

In one advantageous configuration, it can be provided that the main body is molded and/or pressed. Consequently, a cost-effective main body is usable. The main body here can be molded by thermoforming, for example by compression or injection molding, and/or pressed by reshaping or primary forming, for example by precision blank pressing. It is particularly cost-effective if the main body is produced from a polymer material, for example from one of the polymer materials already mentioned. The main body can also be produced from a glass, for example by precision blank pressing.

In one advantageous configuration, it can be provided that the at least two camera functional units, in particular of the camera functional units formed on a common main body, are produced in a two- or multicomponent production method. What is advantageous here is that a frame and an optical element, for example a lens and/or a filter, which is fixed or formed on the frame can be formed as two different components having different refractive indices and/or transmissivities. Alternatively or additionally, it can be provided that the at least two camera functional units are produced in an insert method. Prefabricated optical elements are thus usable.

In one advantageous configuration, it can be provided that each camera functional unit has at least two optical elements which define at least two optical channels or beam paths. Consequently, it is possible to provide different optical functions, for example for recordings in different wavelength ranges (for example ultraviolet (UV), visible (VIS) and/or infrared (IR)) and/or with different recording directions, focal lengths, aperture angles and/or diaphragm apertures. These can be detected by separate or jointly used image sensors.

BRIEF DESCRIPTION OF THE DRAWINGS

The invention will now be described on the basis of exemplary embodiments, but is not restricted to these exemplary embodiments. Further exemplary embodiments arise through combination of the features of individual or a plurality of claims among one another and/or with individual or a plurality of features of the exemplary embodiments.

In the figures:

FIG. 1 shows a preassembled camera functional unit according to the invention before the folding or bending process in a greatly simplified illustration, FIG. 2 shows the camera module in accordance with FIG. 1 in a three-dimensional perspective view in a simplified illustration, FIG. 3 shows the camera module according to the invention from FIG. 2 in an intermediate step of the folding or bending process of the production method according to the invention, FIG. 4 shows a finished assembled camera module according to the invention in accordance with FIG. 3 after the conclusion of the folding or bending process of the production method according to the invention.

DETAILED DESCRIPTION OF THE PREFERRED EMBODIMENTS

Figure 5:
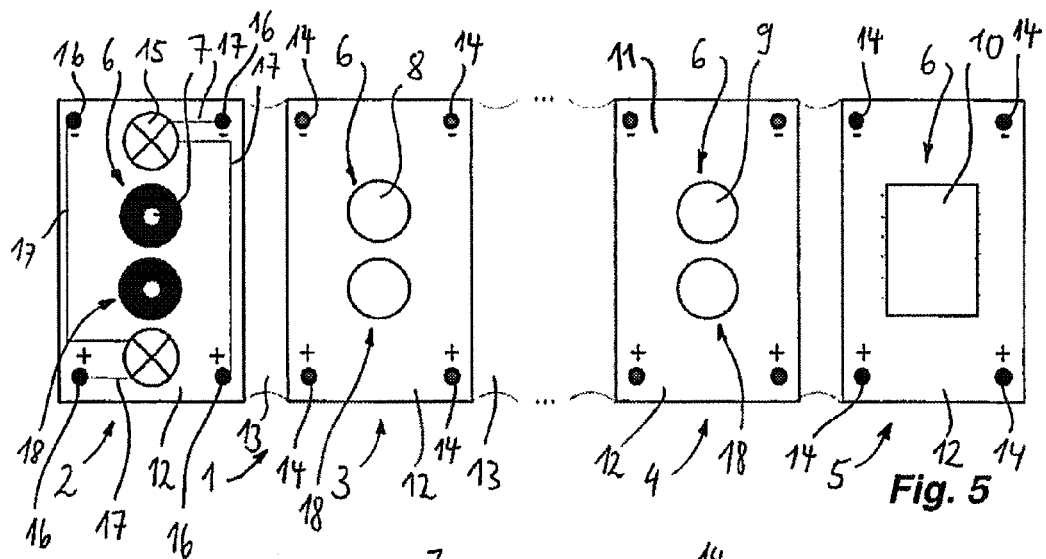
FIG. 5 shows a camera module according to the invention analogous to FIG. 1, but for stereoscopic vision.
Figure 6:
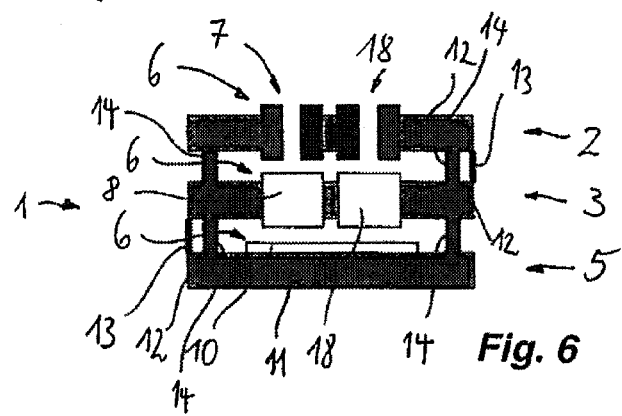
FIG. 6 shows the camera module in accordance with FIG. 5 in a greatly simplified sectional illustration.

FIG. 1 shows a camera module according to the invention, said camera module being designated as a whole by 1, in a planar, folded open or bent open state before the folding or bending process of the production method according to the invention. The camera module 1 comprises a multiplicity of camera functional units 2, 3, 4, 5 and further camera functional units indicated by dots, which are arranged in a manner aligned along a line in one plane in the position shown in FIG. 1. In further exemplary embodiments, the camera functional units 2, 3, 4, 5 are connected to one another in a deviating arrangement in one plane or camera modules comprising at least two or more of the camera functional units 2, 3, 4, 5 are formed.

FIG. 2 shows the camera module 1 in a three-dimensional perspective view, wherein only the camera functional units 2, 3, 5 are shown and the other camera functional units are omitted for the sake of simplifying the illustration.

FIG. 3 shows the camera module in accordance with FIG. 2 in an intermediate step of a folding or bending process, still to be described in greater detail, while FIG. 4 shows the finished produced camera module 1. FIGS. 1 to 4 are described jointly below.

The camera functional units 2, 3, 4, 5 in each case carry at least one optical element 6. In the use position in accordance with FIG. 4, the camera functional units 2, 3, 4, 5 are arranged in a stack arrangement in each case in separate planes.

The individual planes are arranged sequentially one behind another along a beam path formed by the optical elements 6 of the camera functional units 2, 3, 4, 5.

In this case, the camera functional unit 2 is equipped for example with a diaphragm 7 as optical element 6. The camera functional units 3, 4 and further camera functional units are provided with optical elements 6 in the form of lens arrangements 8, 9.

The camera functional unit 5 is provided with an image sensor 10, by which an image of the beam path already mentioned can be recorded digitally.

The camera module 1 is provided for use in an endoscope known per se, said endoscope not being illustrated any further, wherein the camera functional unit 2 is arranged distally and the camera functional unit 5 is arranged proximally.

In this way, the field of view of the camera module 1 is aligned in the distal direction.

It can be seen in FIG. 1 that the camera functional units 2, 3, 4, 5 and further camera functional units are produced on a common main body 11.

This main body 11 is firstly molded or pressed in a pressing or injection molding method or by precision blank pressing, wherein the optical elements 6—insofar as possible—are already formed in this production step.

As is illustrated by FIGS. 2 to 4, the camera functional units 2, 3, 4, 5 and further camera functional units are subsequently aligned with respect to one another in the use position in a multi-stage folding or bending process. This gives rise to the finished camera module 1, in accordance with FIG. 4.

Before the beginning of said folding or bending process, by contrast, the camera functional units 2, 3, 4, 5 are aligned in a common plane in accordance with FIG. 1. The camera functional units 2, 3, 4, 5 are prefabricated in said plane.

In this regard, by way of example, the lens arrangement 8 can be shaped on the main body 11 by precision blank pressing, while the image sensor 10 is inserted into the main body 11 during the molding thereof.

The main body 11 here is comprised of a respective frame 12 for each camera functional unit 2, 3, 4, 5 and of connecting folding or bending sections 13. A respective folding or bending section 13 integrally connects two frames 12.

The folding or bending sections 13 are configured such that they permit the folding or bending process illustrated by FIGS. 2 to 4, for example by material weakening.

The camera functional units 2, 3, 4, 5 are thus formed in each case on a frame 12 of the main body 11.

Spacer elements 14 are formed on the frame 12 of the camera functional unit 3. It can be seen in FIG. 2 that said spacer elements 14 project from a plane defined by the frame 12 carrying them.

In the use position in accordance with FIG. 4, the spacer elements 14 contact the adjacent frame 12 of the adjacent camera functional unit 5. The camera functional units 3, 5 are thereby aligned in a defined manner with respect to one another.

Spacer elements 14 are likewise formed as necessary on the other camera functional units 2, 4, 5, said spacer elements ensuring a defined distance and a defined alignment with respect to the adjacent camera functional unit 2, 3, 4, 5.

The main body 11 with the frames 12 and the folding or bending sections 13 and also the spacer elements 14 is produced in one production method, for example compression or injection molding or precision blank pressing. The main body 11 is integral and consists of a polymer material, for example of polycarbonate or PMMA (Plexiglas).

It can be seen in FIG. 1 that the distally arranged camera functional unit 2 additionally has illumination means 15.

A scene situated in front of the diaphragm 7 can be illuminated by said electrical illumination means 15.

The electrical illumination means 15 are contacted here by terminals 16 which, in the use position in accordance with FIG. 4, are brought into contact with the spacer elements 14 of the adjacent camera functional unit 3. The spacer elements 14 here have in each case an electrical lead (not illustrated in further detail), such that a respective electrical lead, represented by the symbols "−" and "+" in FIG. 1, arises in the use position in accordance with FIG. 4. An electrical lead to the electrical illumination means 15, which can be an electric light, from the proximal camera functional unit 5 to the distal camera functional unit 2 is thus produced by the folding or bending process resulting in the arrangement in accordance with FIG. 4.

In a further exemplary embodiment, the electrical leads 17 are guided in the folding or bending sections 13 between the distal camera functional unit 2 and the proximal camera functional unit 5.

FIG. 5 shows a further camera module according to the invention, said camera module being designated as a whole by 1. In the case of this camera module 1, component parts and functional units which are functionally and/or structurally identical or similar to the camera module 1 in accordance with FIGS. 1 to 4 are designated by the same reference signs and will not be described separately again. The explanations concerning FIGS. 1 to 4 are therefore correspondingly applicable to FIG. 5.

In the case of the exemplary embodiment in accordance with FIG. 5, the camera functional units 2, 3, 4 in each case have a second optical element 18 in addition to the optical element 6. The second optical element 18 is formed in a manner corresponding to the optical element 6 of the camera functional unit 2, 3, 4, such that the optical elements 6, 18 are formed on the camera functional units 2, 3, 4 in each case in pairs. The camera functional unit 2, 3, 4 and thus the camera module 1 are designed for stereoscopic vision in this way. Optical elements 6, 18 which respectively correspond to one another are formed on a common rigid frame 12. The optical elements 6 thus define a first or right optical channel and the optical elements 18 define a second or left optical channel.

The image sensor 10 is used jointly for the two beam paths or optical channels of stereoscopic vision.

Figure 8:
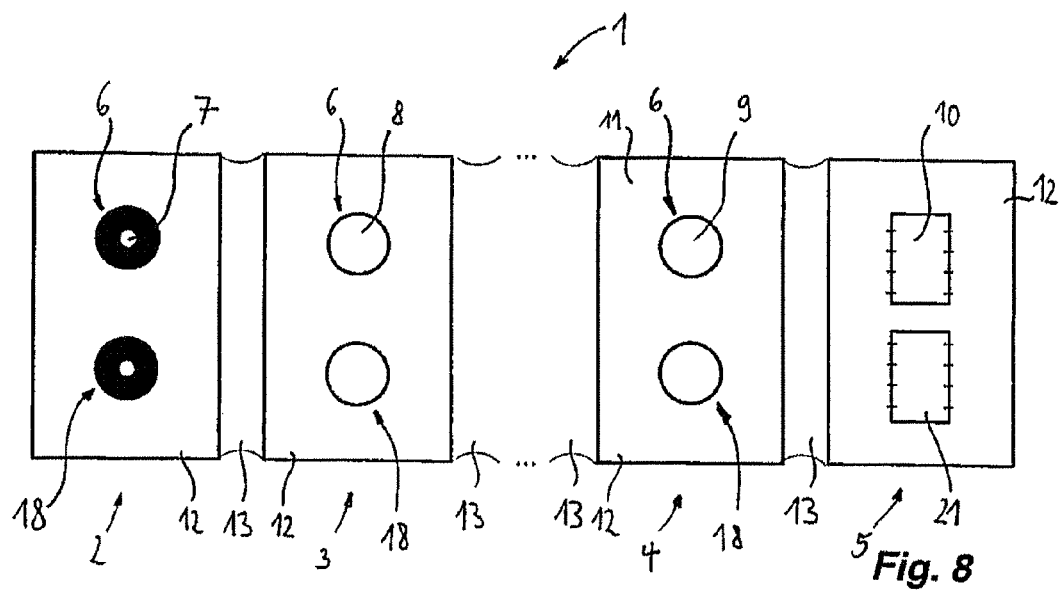
FIG. 8 shows a further camera module according to the invention with separate image sensors.

In a further variant in accordance with FIG. 8, a plurality of image sensors 10, 21 are formed instead of the jointly used image sensor 10. This can be provided for stereoscopic vision or for obtaining additional information, for example depth information or information from a different wavelength range.

For the rest, in FIG. 8, component parts and functional units that are of the same type or identical functionally and/or structurally with respect to the previous exemplary embodiments are designated by the same reference signs and will not be described separately again. The explanations concerning FIGS. 1 to 6 are therefore correspondingly applicable to FIG. 8.

Figure 7:
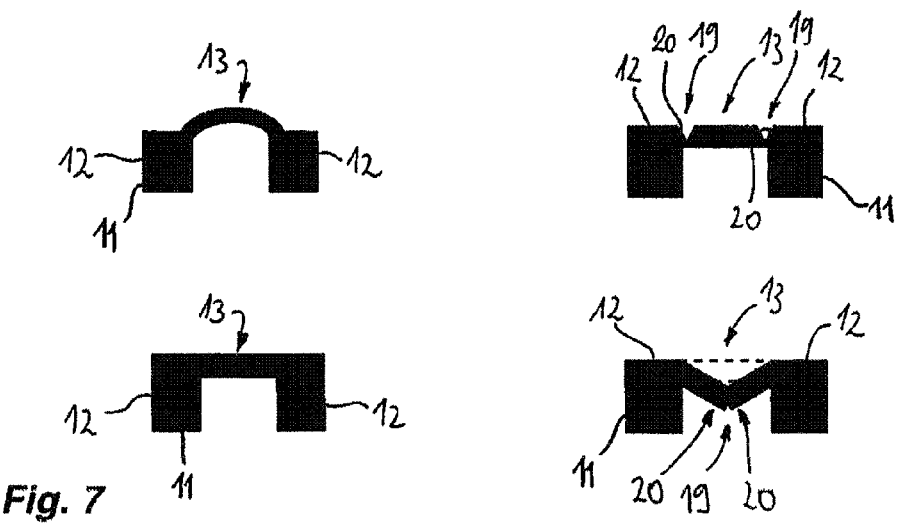
FIG. 7 shows examples of different cross sections of a folding or bending section in a camera module according to the invention.

FIG. 7 shows four different profiles for folding or bending sections 13 in each case in the use position.

While the profiles on the left-hand side of FIG. 7 remain intact after the folding or bending process, the folding or bending sections 13 in the case of the profiles in the right-hand half of FIG. 7 are equipped with predetermined breaking locations 19. These predetermined breaking locations 19 break open during the folding or bending process or are broken open subsequently.

As a result, the frames 12 have edges 20 which correspond to one another in each case and which for their part have the predetermined breaking location 19. By virtue of the corresponding arrangement of the edges 20 with the residues of the predetermined breaking location 19, it is evident that a predetermined breaking location 19 was separated in the production method.

A space requirement produced by the folding or bending sections 13 can be released in this way.

Figure 9:
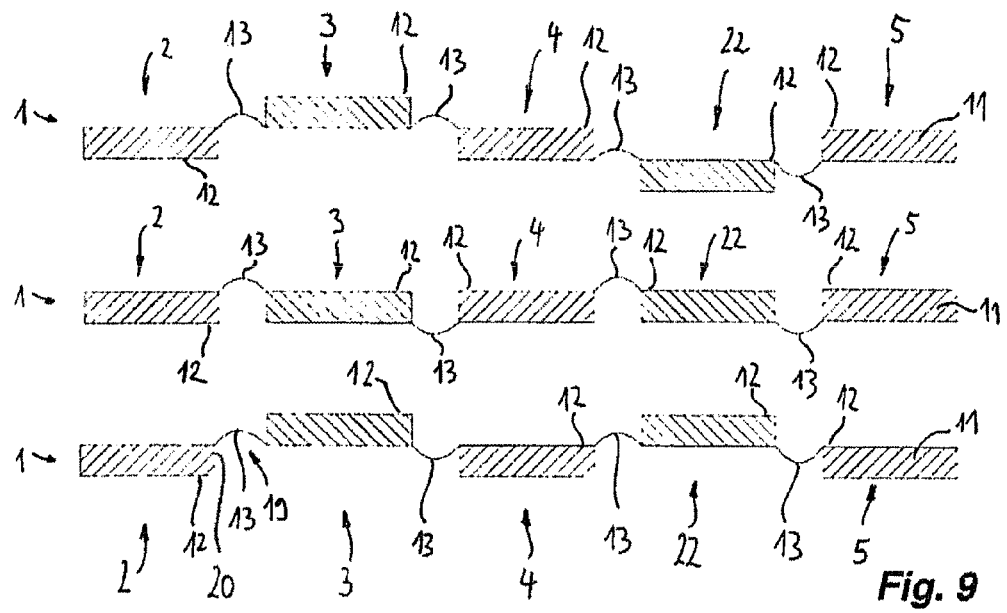
FIG. 9 shows different camera modules according to the invention in sectional illustration in a folded open or bent open state.

FIG. 9 shows by way of example three possible arrangements of the camera functional units 2, 3, 4, 5 and of a further camera functional unit 22 with respect to one another in the folded open or bent open state before the folding and/or bending process mentioned. The number of camera functional units 2, 3, 4, 5, 22 is illustrated merely by way of example and can be chosen differently in further exemplary embodiments. It is evident that the main body 11 is thus formed in an unfolded fashion. As a result, the camera functional units 2, 3, 4, 5, 22 are arranged in a flat fashion and substantially or exactly in a common plane. The camera functional units 2, 3, 4, 5, 22 can thus be arranged above and/or below and/or in an imaginary mathematical plane that runs horizontally in FIG. 9. The unfolded state can thus be characterized, for example, by the fact that a covered supporting area is larger by a multiple than a supporting area occupied by the finished assembled camera module 1—for example in accordance with FIG. 4.

For the rest, in FIG. 9, component parts and functional units that are of the same type or identical functionally and/or structurally with respect to the previous exemplary embodiments are designated by the same reference signs and will not be described separately again. The explanations concerning FIGS. 1 to 8 are therefore correspondingly applicable to FIG. 9.

Figure 10:
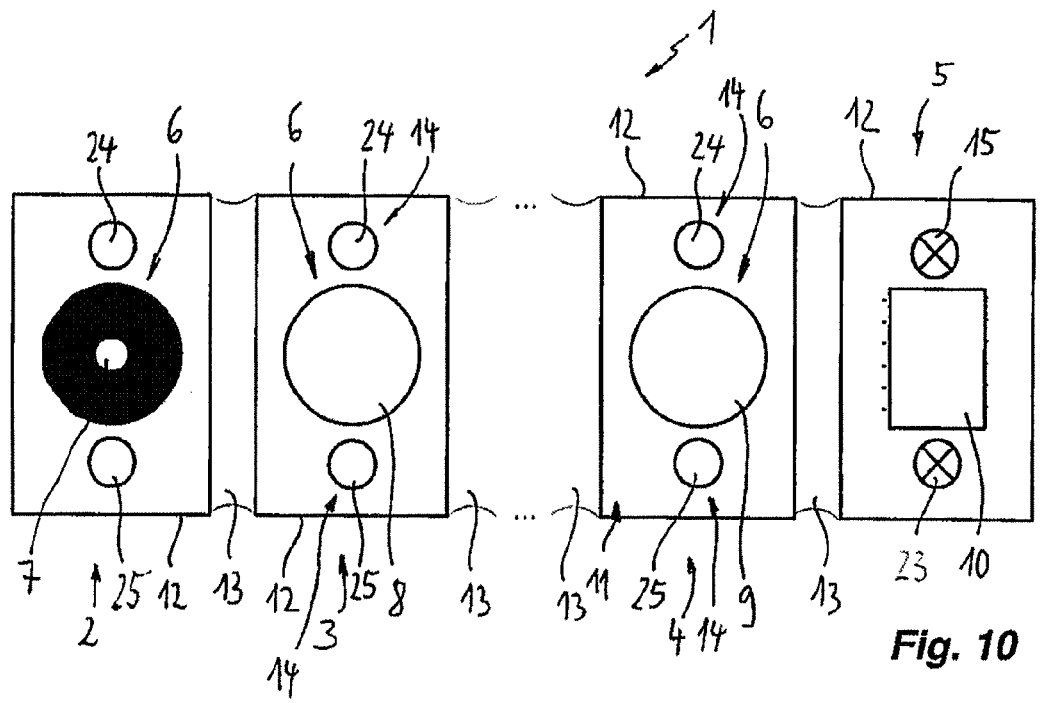
FIG. 10 shows a further camera module according to the invention with illumination means arranged proximally.

FIG. 10 shows a further camera module 1 according to the invention in the unfolded state. Component parts and functional units that are of the same type or identical functionally and/or structurally with respect to the previous exemplary embodiments are designated by the same reference signs and will not be described separately again. The explanations concerning FIGS. 1 to 9 are therefore correspondingly applicable to FIG. 10.

In the case of the exemplary embodiment in accordance with FIG. 10, second electrical illumination means 23 are formed in addition to the electrical illumination means 15. The illumination means 15 and the second illumination means 23 are formed on the camera functional unit 5, which also carries the image sensor 10 and is arranged proximally.

Light guides 24 in each of the other camera functional units 2, 3, 4 form a first optical channel, which guides light from the illumination means 15 to a distal examination site.

Light guides 25 in camera functional units 2, 3, 4 form a second optical channel, by which light can be guided from the second illumination means 23 to the examination site.

In further exemplary embodiments, the illumination means 15, 23 can be formed as a common illumination means, for example with a beam splitter. In further exemplary embodiments, only one illumination means 15 is arranged proximally. The light guides 25 can thus be omitted in this exemplary embodiment.

It can also be seen in FIG. 10 that the light guides 24 are simultaneously formed as spacer elements 14 which keep the camera functional units 2, 3, 4, 5 aligned with one another in the finished assembled situation.

Figure 11:
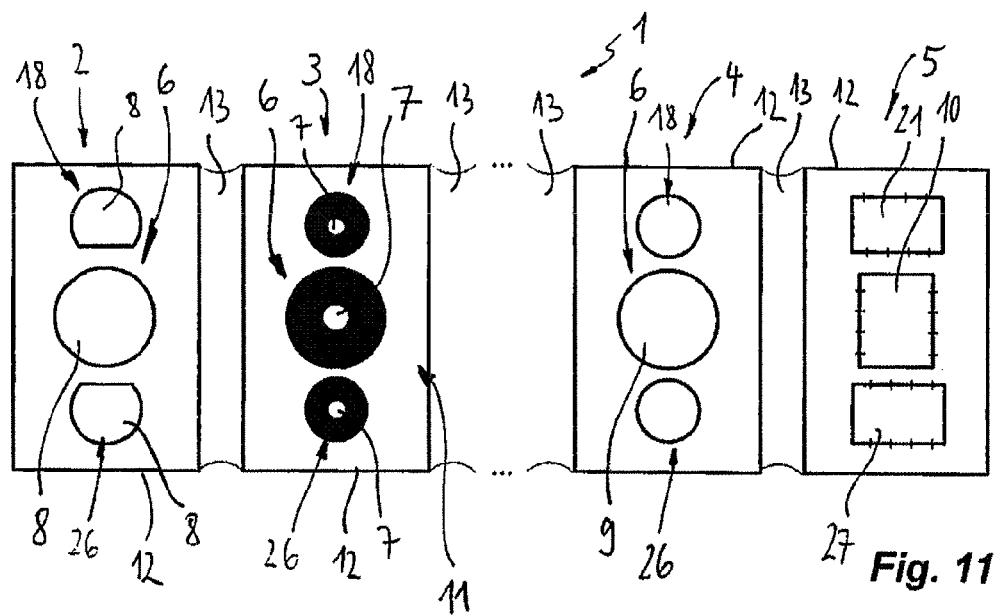
FIG. 11 shows a further camera module according to the invention with more than two optical channels for image recording.

FIG. 11 shows a further exemplary embodiment of a camera module 1 according to the invention. Component parts and functional units that are of the same type or identical functionally and/or structurally with respect to the previous exemplary embodiments are designated by the same reference signs and will not be described separately again. The explanations concerning FIGS. 1 to 10 are therefore correspondingly applicable to FIG. 11.

In the case of the exemplary embodiment in accordance with FIG. 11, third optical elements 26 are arranged in each camera functional unit 2, 3, 4. In this case, in the finished assembled position, the first optical elements 8 form a first optical channel, the second optical elements 18 form a second optical channel and the third optical elements 26 form a third optical channel.

In this case, the first optical channel is read by a first image sensor 10, the second optical channel is read by a second image sensor 21 and the third optical channel is read by a third image sensor 27. The image sensors 10, 21, 27 can be formed with different image resolutions and/or for different wavelength ranges and/or generally with different recording behaviors. The image sensors 10, 21, 27 can also be formed as a common image sensor or be formed by two separate image sensors.

It can be also be seen in FIG. 11 that the optical elements 6 on the camera functional unit 3 arranged at the second position from the distal end can be formed as diaphragms 7. The optical elements 6, 18 and 26 on the distal camera functional unit 2 can be formed here by lens arrangements 8 which predefine an individual aperture angle, an individual focal length and/or an individual recording direction for each optical channel.

By way of example, in FIG. 11 it can be provided that the optical elements 18 and 26 are designed for stereoscopic vision or for identical vision in a corresponding wavelength range in recording directions facing away from one another. The first optical channel with the optical elements 6 can be formed with higher resolution, with a different focal length and/or with a different aperture angle and/or in a different wavelength range. Further combinations of these individual features described are realized in further exemplary embodiments.

The arrangements in accordance with FIGS. 1, 5, 8, 10 and 11 are intended to serve merely for illustrating individual aspects of the invention. Combinations of these aspects are provided for realizing the described invention in further exemplary embodiments.

In the case of the camera module 1 comprising at least two camera functional units 2, 3, 4, 5 arranged one behind another in a stack arrangement, it is proposed to form the camera functional units 2, 3, 4, 5 on a common main body 11, wherein the camera functional units 2, 3, 4, 5 are aligned with respect to one another in the use position by means of a folding or bending process.

LIST OF REFERENCE SIGNS

1 Camera module
2 (Distal) camera functional unit
3 Camera functional unit
4 Camera functional unit
5 (Proximal) camera functional unit
6 Optical element
7 Diaphragm
8 Lens arrangement
9 Lens arrangement
10 Image sensor
11 Main body
12 Frame
13 Folding or bending section
14 Spacer element
15 Illumination means
16 Contact
17 Lead
18 Second optical element
19 Predetermined breaking location
20 Edge
21 Further image sensor
22 (Further) camera functional unit
23 Second illumination means
24 Light guides
25 Light guides
26 Third optical element
27 Third image sensor

The invention claimed is:

1. A method for producing a camera module (1), comprising:
forming at least two camera functional units (2, 3, 4, 5, 22) on a common main body (11), and subsequently;
aligning the at least two camera functional units (2, 3, 4, 5, 22) with respect to one another in a folding or bending process so that the at least two camera functional units (2, 3, 4, 5, 22) are arranged one behind another in a respective plane along a beam path of the camera module (1); and
providing a first camera functional unit (5) of the at least two of the camera functional units (2, 3, 4, 5, 22) formed on the common main body (11) with at least one image sensor (10), and a second camera functional unit (3, 4, 22) of the at least two of the camera functional units (2, 3, 4, 5, 22) formed on the common main body (11) with in each case at least one molded in lens arrangement (8, 9).

2. The method as claimed in claim 1, wherein at least three of the camera functional units (2, 3, 4, 5, 22) are arranged one behind another in the respective plane along the beam path of the camera module (1), and at least two of the camera functional units (2, 3, 4, 5, 22) are formed on the common main body (11) and are subsequently aligned with respect to one another in the folding or bending process.

3. The method as claimed in claim 1, wherein the camera functional units (2, 3, 4, 5, 22) are provided with in each case at least one device, selected from an image sensor (10), a diaphragm (7) or a lens arrangement (8, 9).

4. The method as claimed in claim 1, further comprising:
providing a camera functional unit (2, 3, 4, 5, 22) with an image sensor (10) separately that is not formed on the main body (11), and
placing the main body (11) onto the image sensor (10).

5. A method for producing a camera module (1), comprising:
forming at least two camera functional units (2, 3, 4, 5, 22) on a common main body (11), and subsequently
aligning the at least two camera functional units (2, 3, 4, 5, 22) with respect to one another in a folding or bending process so that the at least two camera functional units (2, 3, 4, 5, 22) are arranged one behind another in a respective plane along a beam path of the camera module (1); and designing the camera functional units (2, 3, 4, 5, 22) for stereoscopic vision with optical elements (6, 18) formed in each case in pairs.

6. The method as claimed in claim 1, further comprising: forming the at least two of the camera functional units (2, 3, 4, 5, 22) on the common main body (11), before the folding or bending process, such that in an unfolded state, the at least two of the camera functional units are at least one of flat or in a common plane.

7. The method as claimed in claim 1, wherein the at least two of the camera functional units (2, 3, 4, 5, 22) formed on the common main body (11) are formed in each case on a frame (12) of the main body (11), the frames (12) are produced in a manner integrally connected to one another via a folding or bending section (13), or on at least one of the frames (12) there is formed at least one spacer element (14) projecting from a plane described by the frame (12), or both.

8. The method as claimed in claim 1, further comprising: molding the main body (11) by compression or injection molding, or pressed, by precision blank pressing, from a polymer material or from glass or both, wherein the at least two camera functional units (2, 3, 4, 5, 22), formed on the common main body (11), are produced in a two- or multicomponent production method or an insert method.

9. The method as claimed in claim 1, further comprising: forming a predetermined breaking location (19) between the at least two of the camera functional units (2, 3, 4, 5, 22) formed on the common main body (11), and separating he at least two of the camera functional units at the predetermined breaking location (19) during the folding or bending process.

10. A camera module (1), comprising at least two camera functional units (2, 3, 4, 5, 22) which are arranged one behind another in a respective plane in a beam path of the camera module (1), and the at least two camera functional units (2, 3, 4, 5, 22) are produced on a common main body (11), and wherein a first camera functional unit (2, 5) of the at least two of the camera functional units (2, 3, 4, 5, 22) formed on the common main body (11) has at least one image sensor (10), and a second camera functional unit (3, 4, 22) of the at least two of the camera functional units (2, 3, 4, 5, 22) formed on the common main body (11) have in each case at least one molded in lens arrangement (8, 9).

11. The camera module (1) as claimed in claim 10, wherein the camera functional units (2, 3, 4, 5, 22) are provided with in each case at least one device, selected from a diaphragm (7) or a lens arrangement (8, 9), or further comprising:

a separate camera functional unit (2, 3, 4, 5, 22) provided with an image sensor (10) that is not formed on the main body (11), with the main body (11) being placed onto the image sensor (10).

12. A camera module (1), comprising at least two camera functional units (2, 3, 4, 5, 22) which are arranged one behind another in a respective plane in a beam path of the camera module (1), and the at least two camera functional units (2, 3, 4, 5, 22) are produced on a common main body (11), wherein the camera functional units (2, 3, 4, 5, 22) are designed for stereoscopic vision and have optical components (6, 18) in each case in pairs.

13. The camera module (1) as claimed in claim 10, wherein the at least two of the camera functional units (2, 3, 4, 5, 22) formed on the common main body (11) are formed in each case on a frame (12) of the main body (11), and the frames (12) are integrally connected to one another via a folding or bending section (13), or the frames (12) have a predetermined breaking location (19) at corresponding edges (20), or both.

14. A camera module (1), comprising at least two camera functional units (2, 3, 4, 5, 22) which are arranged one behind another in a respective plane in a beam path of the camera module (1), and the at least two camera functional units (2, 3, 4, 5, 22) are produced on a common main body (11), wherein the at least two of the camera functional units (2, 3, 4, 5, 22) formed on the common main body (11) are formed in each case on a frame (12) of the main body (11), and the frames (12) are integrally connected to one another via a folding or bending section (13), or the frames (12) have a predetermined breaking location (19) at corresponding edges (20), or both and wherein on at least one of the frames (12) there is formed at least one spacer element (14) projecting from a plane described by the frame (12), said spacer element making contact with another one of the frames (12).

15. A camera module (1), comprising at least two camera functional units (2, 3, 4, 5, 22) which are arranged one behind another in a respective plane in a beam path of the camera module (1), and the at least two camera functional units (2, 3, 4, 5, 22) are produced on a common main body (11), wherein at least one of the camera functional units (2) of the at least two camera functional units (2, 3, 4, 5, 22) has at a distal end an electrical illumination means (15), or at least one proximal camera functional unit (5) of the at least two camera functional units (2, 3, 4, 5) has an electrical illumination means (15, 23), or all of the camera functional units (2, 3, 4, 22) in each case have light guides (24, 25) by which a generated light of the illumination means (15, 23) is guidable to a distal end.

16. A camera module (1), comprising at least two camera functional units (2, 3, 4, 5, 22) which are arranged one behind another in a respective plane in a beam path of the camera module (1), and the at least two camera functional units (2, 3, 4, 5, 22) are produced on a common main body (11), wherein the at least two of the camera functional units (2, 3, 4, 5, 22) formed on the common main body (11) are formed in each case on a frame (12) of the main body (11), and the frames (12) are integrally connected to one another via a folding or bending section (13), or the frames (12) have a predetermined breaking location (19) at corresponding edges (20), or both and further comprising: an electrical lead (18) between the at least two camera functional units (2, 3, 4, 5, 22) formed in or on the folding or bending section (13) or in or on a spacer element of the main body between the at least two camera functional units (2, 3, 4, 5, 22).

17. The camera module (1) as claimed in claim 10, wherein the main body (11) is molded by compression or injection molding, or pressed by precision blank pressing, from at least one of a polymer material or from glass, or the at least two camera functional units (2, 3, 4, 5, 22) are produced in a two- or multicomponent production method or an insert method.

18. A camera module (1), comprising at least two camera functional units (2, 3, 4, 5, 22) which are arranged one behind another in a respective plane in a beam path of the camera module (1), and the at least two camera functional units (2, 3, 4, 5, 22) are produced on a common main body (11), wherein each of the camera functional unit (2, 3, 4, 5,

22) has at least two optical elements (8, 18, 26) which define at least two optical channels or beam paths.

* * * * *